April 23, 1968 F. J. BRACEY, JR 3,379,595
PROCESS AND APPARATUS FOR HEAT SEALING THERMOPLASTIC MATERIALS
Filed Jan. 26, 1965 2 Sheets-Sheet 1

INVENTOR.
Frederick J. Bracey, Jr.
BY
James F. Snowden
Attorney

INVENTOR.
Frederick J. Bracey, Jr.
BY
James F. Snowden
Attorney

United States Patent Office 3,379,595
Patented Apr. 23, 1968

3,379,595
PROCESS AND APPARATUS FOR HEAT SEALING
THERMOPLASTIC MATERIALS
Frederick J. Bracey, Jr., Somers, Conn., assignor to Mobil
Oil Corporation, a corporation of New York
Filed Jan. 26, 1965, Ser. No. 428,118
18 Claims. (Cl. 156—306)

ABSTRACT OF THE DISCLOSURE

Heat sealing or welding a seam in a plurality of layers of thermoplastic material while minimizing the formation of beads adjacent the seam by firmly clamping the borders only of a thin, resiliently deformable metal strip against the exterior face of assembled layers of plastic material using a slotted clamp and a flat anvil as a backing member, and then advancing the elongated edge of a heated press member through the open slot in the clamp to bear against the exposed central area of the thin metal strip under bonding pressure to establish a thermal gradient therein which heats areas of the thermoplastic material adjacent the seam to a graduated and lesser degree than the seam while the plastic layers are firmly clamped against movement and distortion.

---

The present invention relates to a method and equipment for heat sealing or bonding a plurality (i.e., two or more) of layers of thermoplastic materials together. In one particular embodiment, it is concerned with bonding assemblies in which one or more of such layers of material contain resins which are subject to distortion when heated.

Layers or wall sections of articles made of thermoplastic materials have been bonded or welded together along a strip by heat sealing techniques in which two heated press shoes are forced against opposite faces of the assembled layers or alternatively a single heated shoe presses against superposed layers supported by an anvil or other backing member. Raised beads or ridges are commonly produced by such procedures, especially when sealing materials more than a few mils thick or when relatively high temperatures are utilized. Such beads are located along the edges of the welded strip and are generally unsightly as they are raised not only above the groove formed by the heat sealing operation but also project above the surrounding surface of the layer or article. In some cases, these beads are relatively jagged in contour.

It has been found that these beads along a bonded seam or heat sealed joint are due to the generally low heat conductivity of resins; consequently the heat of an elongated press shoe is transferred essentially only to the narrow strip or area which is actually being bonded while closely adjacent areas along that strip receive very little heat. As a result, thermoplastic material directly underlying the edge of the press shoe is melted and squeezed up the sides of the bonding groove into ridges while closely adjacent material does not undergo plastic flow or even appreciable softening. This condition is especially pronounced in the sealing of thermoplastic layers with a single heated press shoe in which all of the heat for bonding material is received from one face or side of the assembly to be welded. In some instances, an excessive amount of molten resin is displaced from the welding groove or seam by the aforesaid squeezing action with a consequent weakening of the article along this seam.

The instance invention is concerned with a new and improved technique for bonding two or more layers or wall sections of thermoplastic material ranging from relatively thick sections down to films of only one mil (0.001 inch) or less in thickness. More specifically, the present invention comprises suitable apparatus and a process for heat sealing layers of thermoplastic material by steps which include clamping a relatively thin sheet of material having a substantial heat conductivity outside of a plurality of layers of weldable thermoplastic material in superimposed or lapped relation in spaced areas separated by an intermediate area in which a face of said thin sheet is exposed, contacting the exposed face of said thin sheet in said intermediate area with a heated body while exerting sufficient force to press the underlying areas of said layers of thermoplastic material firmly together, and transferring sufficient heat by conduction from said heated body through said intervening thin sheet into the adjoining layer of thermoplastic material over a substantially larger area of said adjoining layer than the area of contact between said heated body and said thin sheet to bond at least two of said layers of thermoplastic material together without formation of a bead along the surface of the resulting bonded area of said layers.

Other aspects of the invention relate to the use of a thin sheet which is resiliently deformable under pressure, especially a sheet made of a material which has a heat conductivity of at least about 0.0001 B.t.u./sec./sq. in./°F./in. This sheet desirably has a thickness between about 1 and 35 mils and it is preferably made of one of the common metals or alloys. In addition, the new process has especial application in sealing oriented layers of thermoplastic material, particularly biaxially oriented polymeric styrene composition, such as high impact copolymers of styrene and a hydrocarbon elastomer. Other features involve firmly clamping the assembly of layers of thermoplastic material under sufficient pressure to prevent substantial alteration of the planar dimensions thereof and contacting the exposed face of the thin sheet with a curved part of the heated body. A significant aspect of the invention is the contact of the heated body with the thin, heat conductive sheet that establishes a thermal gradient of elevated temperatures in said thin sheet which gradually decrease from a maximum temperature in the area of contact as the distance from said area increases and which provides temperatures above the softening point of the thermoplastic material in areas thereof closely adjacent to the area being bonded and thus minimizes bead formation.

In connection with the latter feature, the highest temperatures are in the area of contact and the assembly of thermoplastic material is bonded at the point or strip underlying said contact area. However, a larger surrounding area of the thin sheet is heated to a lesser degree by conduction from the contact area through the sheet, and the thermal gradient effect serves to raise the temperatures of the surface of the adjoining or nearest thermoplastic layer above its softening point in the immediate vicinity of the aforesaid contact area; and this in combination with the bonding pressure produces plastic flow to an extent sufficient to eliminate the formation of a jagged or beaded edge along the bonded area. Inasmuch as the thin sheet is temporarily deformed or flexed into a gentle curve by the bonding pressure, it serves to shape the thermoplastic material and produce a curved surface of smooth configuration on each side of the groove formed in the thermoplastic material by the heat sealing operation. The graduated heating also provides improved temperature control which eliminates or at least minimizes parting of films during bonding and fractures and splitting along the welded seam in sheets.

For a better understanding of the matter and objects of this invention, reference should be had to the accompanying drawings in which many conventional apparatus details are omitted for greater clarity. In addition, certain elements therein are exaggerated for illustrative purposes. For example, thin sheet materials, layers and wall sections are shown considerably thicker than is actually the case.

Figure 1:
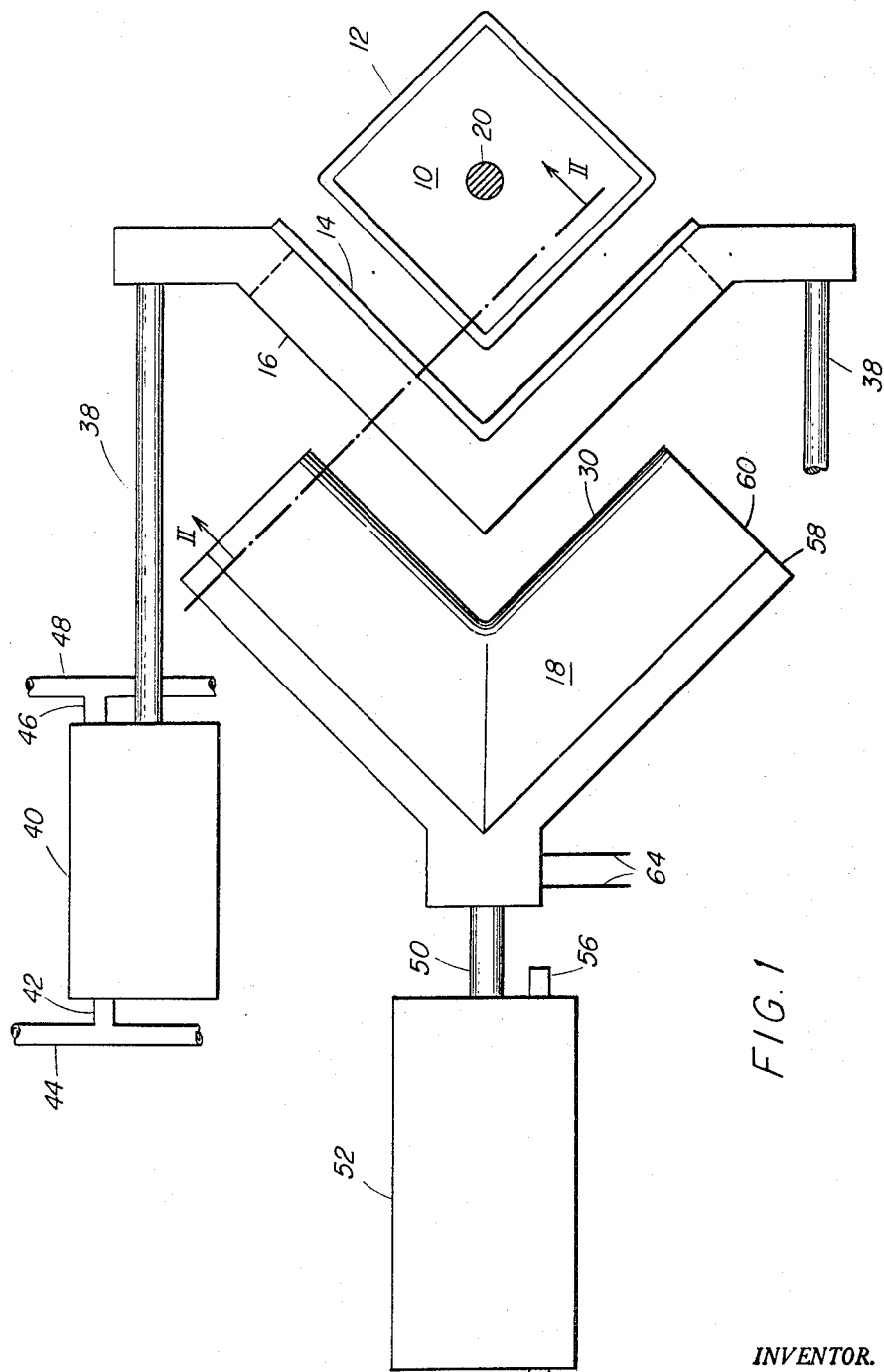
FIG. 1 is a plan view of equipment suitable for the practice of the invention with a container assembled thereon preparatory to carrying out the heat sealing operation.

Turning now to FIG. 1 of the drawing, the main apparatus elements are an anvil or backing member 10 on which the base or end closure 12 of the article is assembled for bonding, a thin metal strip 14, a slotted clamp frame 16 and the heated press shoe 18.

The anvil 10 supports or backs up the article to be sealed during the bonding operation, and it is attached to a shaft or rod 20. For the purpose of illustration, this anvil may be considered as fixed in position, even though it may be subject to intermittent reciprocating motion in one or more directions or rotation when mounted in an automatic sealing machine.

Figure 2:
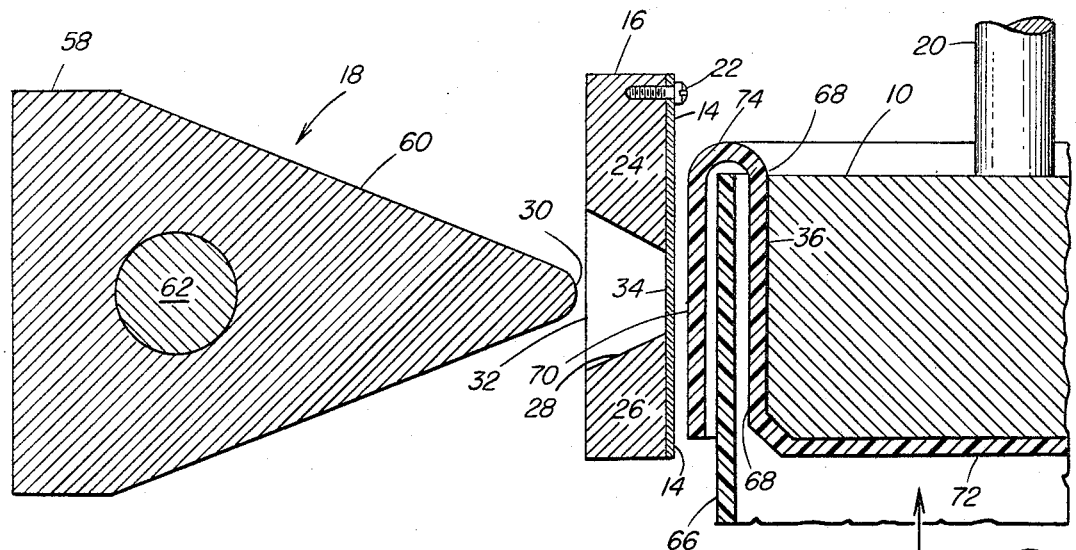
FIG. 2 is a fragmentary vertical section taken on the plane of the line II—II of FIG. 1 in which certain background details have been omitted.

In FIG. 2, it will be seen that the thin heat conductive sheet of metal 14 is attached along one border to the clamp frame 16 by a number of machine screws 22 or other suitable means. The clamp 16 is provided with upper and lower clamping faces 24 and 26, respectively, which are separated by an elongated, tapered slot 28. The slot extends through the full thickness of the frame and is of sufficient size to allow the edge 30 of the press shoe 18 to project therethrough during the sealing operation. This slot desirably tapers from a relatively wide opening 32 on the side facing the press shoe to a narrow elongated opening 34 adjacent the thin sheet 14. When the frame 16 is advanced to its clamping position, its elongated faces 24 and 26 coact with the face 36 of the anvil to hold the sheet 14 against the assembled layers of thermoplastic material to be bonded.

In the case of materials which are subject to distortion or shrinkage under the heat of bonding, as exemplified by biaxially oriented polystyrene, the clamp frame 16 is forced against anvil 10 with sufficient pressure to securely fasten the assembled plastic material therebetween against any movement and thus prevent any substantial alteration of the planar dimensions of the material undergoing sealing. To accomplish this, the clamping device 16 is mounted on the rods 38 which are attached to pistons in the pneumatic or hydraulic cylinders 40 for guided, and usually timed, movement toward and away from the anvil 10 under the influence of a fluid pressure medium, such as compressed air, supplied to the ends of the cylinders through branch connections 42 in the supply line 44 for one end of both cylinders and similarly the branch conduits 46 connected with the supply line 48 for the other end of these cylinders.

Although a unitary clamping gate 16 is preferred for simplicity, this member may be divided into two clamping bars having clamping faces 24 and 26 and actuated by two pairs of pressure cylinders 40. Generally, the clamping device 16 is rigidly constructed of a strong material, such as steel. Also, the slot in the clamp frame is usually designed to have sufficient clearance to avoid direct contact of the heated shoe 18 with the frame in all operating positions.

The thin sheet of material 14 is repeatedly flexed or temporarily deflected under substantial pressure during successive bonding cycles and it is customarily made of a relatively thin stock that is resiliently deformable under pressure, that is a material which will return to its original flat form when the pressure is released. In general, this sheet may range from about 1 to 35 mils in thickness, and it is usually preferable to utilize stock with a thickness of from about 2 to 10 mils. For example, excellent results are obtainable with a 3 mil brass shim stock. Usually, the thinner the sheet the better, as long as it is sufficiently durable and resilient for prolonged operations. In view of the heat conduction function of this element, it should be composed of material having a substantial heat conductivity factor, such as a heat conductivity of at least about 0.0001 B.t.u./sec./sq. in./° F./in. Substantially all of the common metals and alloys possess the necessary heat conductivity including various brasses and bronzes, such as Phosphor bronze and beryllium brass alloys, aluminum alloys, common or tin-plated steel of moderate carbon content, titanium, a wide variety of alloy steels including 18–8 stainless steel, etc. In most heat sealing operations, the higher the heat conductivity of the material in sheet 14 the better, for improved heat conductivity speeds up the operation somewhat and decreases the heat requirement.

Figure 3:
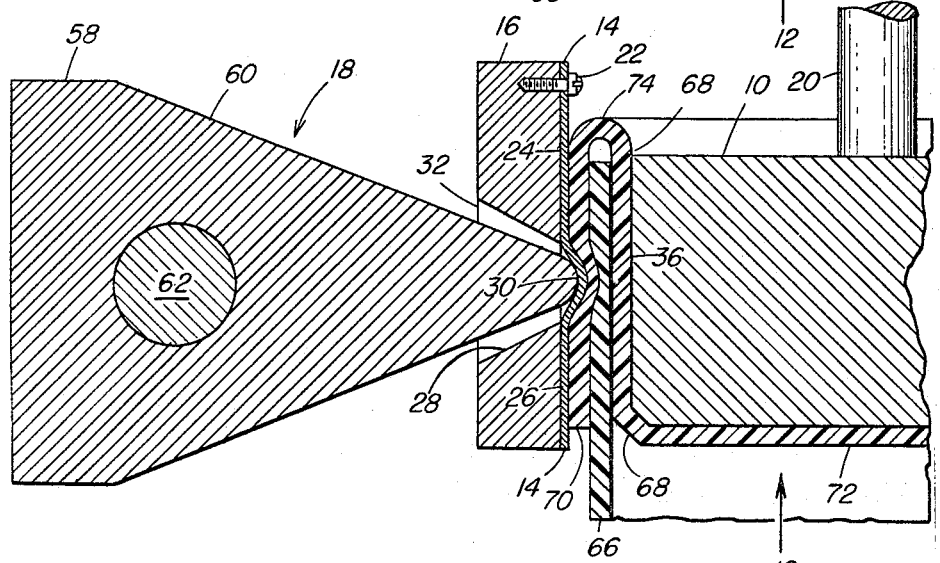
FIG. 3 is a similar vertical cross section on line II—II of FIG. 1 depicting the same apparatus elements during the pressing period in which a base for the container is being bonded to the body thereof under heat and pressure.

The L-shaped or right angle press shoe 18 is mounted on a rod or shaft 50 actuated by a piston in the pneumatic or hydraulic cylinder 52 which is provided with connections 54 and 56 at each end for the admission and withdrawal of the actuating fluid for periodic reciprocating movement toward and away from the anvil 10 as illustrated by the retracted position of the shoe in FIGS. 1 and 2 and its advanced or operating position in FIG. 3. Suitable guide rods or rails (not shown) may be provided, if necessary, to keep the shoe 18 in proper alignment with the slot 28 in the clamping frame. Alternatively, the shoe 18 may be fixed and the anvil 10 together with the clamp frame 16 and the assembly to be sealed may be moved against the fixed shoe.

The die or shoe 18 is desirably of relatively massive construction in order to function as a heat sink or reservoir in storing ample heat for maintaining a constant temperature during rapidly repeated heat sealing cycles. Accordingly, it is usually fashioned of metal with a heavy base 58 and a tapered section 60 extending out to the narrow, rounded edge 30. It is heated by one or more thermostatically controlled electrical resistance heating elements or cartridges 62 which preferably extend for almost the entire length of the press shoe 18. Such heating devices are connected to a suitable source of electrical power by the flexible leads 64 (FIG. 1).

Portions of a container ready to be sealed are shown assembled in the heat sealing apparatus in FIG. 2. The wall 66 of the body of an open ended container which has previously been filled with the desired product is engaged with the spaced walls 68 and 70 of the end closure 12. This particular closure is designed to eventually become either the top or bottom of a container of square cross section, and it is provided with a recessed center 72 and an upturned edge in which the double walls 68 and 70 are connected by a fold or U-bend 74. The space between the double walls of the end closure is ample in width and depth for lapping engagement with the upper edge of wall 66 of the container body and to provide a sufficient area of wall to wall contact for clamping and bonding these two components of the container to form a firm and fluid-tight seal along an elongated strip.

The body and the end closure of the container are both made of the same or different weldable thermoplastic materials which may be exemplified by a high impact polymeric styrene resin in the form of a graft polymer produced by copolymerizing 87 parts of monomeric styrene with 13 parts by weight of polybutadiene. Both components may be molded by thermoforming sheets of extruded resin under vacuum while in a plastic or heat softened condition.

The process of the invention is extremely simple. With the shoe 18 and clamp member 16 both in the retracted position of FIG. 2, electric current is supplied to the heating element 62 to bring the shoe up to a proper temperature for sealing the thermoplastic material. Different thermoplastic resins have considerably different heat softening characteristics, and the operating temperature is determined by a number of factors including the particular resin composition, the thickness of the layers being bonded, the pressure applied and the length of the pressing period. For thermoplastic resins in general, this temperature may be between 250 and 600° F. A temperature of about 350 to 550° is suitable for heat sealing the high impact polystyrene described, and the range of about 350 to 450° is usually preferred.

Next, the bottom or base and the container body are assembled in contact with the anvil 10 as illustrated in FIG. 2; then compressed air is admitted through the connection 42 to the cylinder 40 to push the slotted clamp frame 16 carrying the thin sheet 14 against the outside wall 70 of the end closure to firmly clamp the upper part of the assembled layers of thermoplastic material securely between the clamping face 24 and the face 36 of the anvil and to likewise clamp the lower part of that assembly between clamping face 26 and the anvil face under sufficient pressure to restrain the assembled layers 70, 66 and 68 against any appreciable movement or change in planar dimensions in the clamped area during the heat sealing operation. A gentle holding action is sufficient while bonding some thermoplastic materials; but in the case of oriented materials which are subject to considerable distortion or shrinkage upon exposure to elevated temperatures and of materials under substantial tension or other external stress, it is necessary to clamp such materials firmly against any movement and dimensional change. The clamping force may be regulated by adjusting the pressure in cylinders 40.

As soon as the material to be bonded is clamped, the hot press shoe 18 is advanced by pressure cylinder 52 and rod 50 partially through the slot 28 to the position shown in FIG. 3. Sufficient force is exerted by bearing edge 30 of the shoe coacting with the anvil face to press the thin sheet 14 into firm and intimate contact with the outermost plastic layer 70 and to press the three layers firmly together. Thus the narrow elongated area which is actually bonded or sealed is in the strip underlying the area of contact between edge 30 and sheet 14 in the narrow end 34 of slot 28 which separates the two clamped areas opposite faces 24 and 26. After enough time has elapsed for sufficient heat transfer from the shoe 18 through the thin conductive sheet 14 into the assembled layers of thermoplastic material to bond at least the outer two layers 70 and 66 together, or alternatively all three of the layers, the actuating mechanism for the shoe 18 is reversed by releasing the pressure at connection 54 and applying pressure to the connection 56 of the cylinder 52 to retract the shoe 18 to the position shown in FIG. 2. Clamp frame 16 is withdrawn in a similar manner, either simultaneously or shortly after the press shoe is retracted.

Upon inspecting the welded article, it will be found that the body wall 66 and the end closure 12 are bonded together along two sides in an excellent fluid-tight seal with a shallow groove opposite the edge 30 of the press shoe. A well defined shallow groove with gently rounded edges indicates that a good seal has been produced. To complete the sealing of the square container, it may be rotated 180° along with the anvil 10 about the axis of rod 20 to position the remaining two side walls for bonding to closure 12 in the same manner.

By suitable regulation of the temperature of shoe 18 and the duration of the pressing period, it is possible to bond only walls 70 and 66 together in an article like that shown in FIG. 2 or to heat seal all three layers of thermoplastic material together. Pressing times of about 1 to 5 seconds are appropriate for bonding only the outer two walls of such articles.

It will be appreciated that the sealing force necessary to obtain a good seal is affected by a number of interrelated factors including the sealing temperature, the thickness and configuration of shoe edge 30, the duration of the pressing cycle, and the composition and thickness of the thermoplastic materials. For the purpose of illustration, the force exerted by the shoe 18 may be about 10 pounds per inch of length of edge 30 in bonding a thin assembly of layers of polystyrene having a total thickness of about 15 mils, while a force of about 25 pounds per inch is suitable for an assembly with an overall thickness of about 40 mils.

In the aforesaid sealing operation, it is apparent from FIG. 3 that the resilient sheet 14 is flexed or bent under the force exerted by the rounded edge 30 of the sealing shoe, but this deflection is only temporary and the sheet 14 returns to its original flat form as soon as the pressure is released. The maximum temperatures produced in the thermoplastic material occur along the elongated strip underlying the narrow elongated area of sheet 14 which is in direct contact with the edge 30, as heat from the shoe 18 is transmitted from edge 30 by conduction directly through the metal sheet into the underlying area of the assembled thermoplastic layers. However, by reason of the relatively high heat conductivity of sheet 14, heat from the edge 30 is also transferred by conduction into the areas of the thin sheet above and below the area of actual contact with edge 30. This heating effect is less intense as a result of heat lost to the atmosphere, etc., and the temperatures in such adjacent areas diminish gradually but rapidly as the distance from the area of actual contact increases; nevertheless in a typical bonding operation it is still sufficient to raise the surface of the outer layer 70 of thermoplastic material above the heat softening or plastic flow point of that material under the sealing pressures used. Accordingly, there is a gradual drop in temperature in areas above and below the narrow strip or area being sealed rather than the abrupt change in temperature that occurs when the thin metal sheet 14 is absent. This temperature gradient can be controlled to some extent by selection of the thickness of the thin metal sheet and also by selecting a metal of suitable heat conductivity. For instance, to reduce the aforesaid temperature drop in adjacent areas by improving the transfer of heat thereto, a thicker sheet may be used and it may be made of a metal or alloy of higher heat conductivity (e.g., a 5-mil steel strip may be replaced by a 10-mil brass strip), subject to the other limitations mentioned herein; and conversely a thinner thermal gradient sheet of material having a lower heat conductivity (e.g., a 2-mil thick strip of 18-8 stainless steel) is desirable for increasing said temperature drop by reducing the heat conduction to the adjacent areas.

In addition, while the thin sheet 14 alone does not exert a substantial shaping pressure against the adjoining layer of thermoplastic material in the area opposite the narrow end 34 of the slot, when the edge 30 of the press shoe advances, it forces the metal sheet to flex inwardly against the assembled thermoplastic material in the form of a gentle curve which serves to correspondingly shape the surface of layer 70 under pressure, particularly when this outer plastic layer has been heated above its softening point. Thus, the sheet 14 not only performs a heat conduction function with thermal gradient characteristics but also serves as a forming or shaping member.

The present invention not only minimizes or eliminates any beads along the sealed or welded strip but also minimizes or eliminates any tendency towards parting any layer at the bonded joint or weakening the joint. This results from the fact that thin sheet 14, establishes both thermal and pressure gradients in areas closely adjacent to the area underlying the narrow end 34 of this slot in the clamps 16. Hence, neither the entire force exerted by the shoe 18 nor the entire amount of heat supplied by it is concentrated in the narrow line of the seal; instead part of the heat and force are also distributed transversely across this line into the adjacent areas of thermoplastic material. The thermal gradient prevents weakening the welded seam by the displacement of an excessive amount of thermoplastic material therefrom as described earlier, and the pressure gradient moderates the application of high bonding pressures which tend to part thin films.

In some applications, as in rapidly repeated bonding cycles on a heat sensitive oriented thermoplastic material, the thermal gradient strip 14 may be heated to the extent that even its borders attain excessively high temperatures with the result that the plastic material shrinks as soon as the clamping pressure is released. This condition may be readily corrected by constructing the clamping frame 16 with passages or channels therein for the circulation of a cooling medium, such as water, in order to absorb heat from the thin sheet 14 at the clamping faces 24 and 26. Such cooling also removes any radiated heat received by the clamping gate 16 from the shoe 18 and thus prevents the transfer of this extraneous heat to the strip 14.

Instead of fastening the thin metal sheet 14 to the clamp frame 16, it may be supported or hung independently of the clamping device. While it is usually desirable to employ a thin sheet large enough to completely cover the clamping faces 24 and 26, this is not necessary provided that the sheet 14 is large enough to be held by both of these faces so that it is not deflected out of contact with the thermoplastic material by the pressure of shoe 18.

The narrow bearing edge 30 of the press shoe may desirably have a transverse contour in the form of any smooth convex curve. For most purposes, a rounded edge is preferred as it appears to produce the best heat sealing action, and its radius may depend somewhat upon the total thickness of the particular assembly being bonded. Narrow flat edges with slightly rounded corners may also be employed on the sealing shoe. However, sharp angular or knife edges are generally avoided as they are likely to cut or permanently deform the thin metal sheet 14; moreover, they do not provide good area contact for the transfer of the heat to the strip 14.

The anvil 10 is usually constructed of metal, such as steel or cast iron, with flat operation faces 36. However, in some instances, as for example where one or more of the layers of thermoplastic material are of uneven gauge, a layer of firm rubber (e.g. of about 40–50 durometer hardness) or another elastomer may be employed as the face material of the anvil, or the entire anvil may be made of such rubber.

The present invention may be practiced in welding or sealing a wide variety of weldable thermoplastic materials including those containing polystyrene, polyethylene, polypropylene, polyallomers, nylon, formaldehyde polymers, plasticized polyvinyl chloride and related vinyl polymers, ethyl cellulose, cellulose acetate, cellulose acetate-butyrate, polymethyl-methacrylate and acrylonitrile-butadiene-styrene resins to name only a few for illustrative purposes. Such resins may be composed of homopolymers, copolymers or various blends thereof; and they may also contain various additives known in the art, including colorants, plasticizers, heat stabilizers, extenders, fillers, and inhibitors against degradation due to oxidation, ultraviolet light, etc. High impact, modified polystyrene produced by copolymerizing styrene with a lesser amount of a hydrocarbon elastomer or another rubbery polymer is one type of widely used resin which may be bonded by the present process.

The sheets or articles to be welded may be fabricated by a number of conventional techniques including, inter alia, extrusion, thermoforming, injection molding, compression molding, blow molding, calendering and laminating. The new method is particularly suitable for joining films, sheets or articles having a wall thickness between about 0.5 and 60 mils, and it is especially recommended for uniting layers of about 10 to 25 mils thickness. The total thickness of the layers or folds of material assembled for bonding may range up to about 125 mils or more.

Although the present invention has been described in considerable detail with reference to one specific simple embodiment in order to emphasize the principles involved, it will be readily apparent to those skilled in the art not only that the invention may be employed in automatic machines as is conventional in the handling, filling and sealing of containers in large numbers but also that many variations are possible in the technique described. For instance, instead of using a press shoe, clamp and thermal gradient sheet, all of L-shape, a shoe with a straight edge may be used in conjunction with a flat sheet and clamp. For some purposes, the bond need not be in the form of a continuous strip and may instead consist of one or a series of spaced spot or tack welds made by a heated press member having one or more curved points rather than elongated rounded edges. Moreover, a single sheet of thermoplastic material may be folded one or more times and the resulting layers welded together. Also, while the pressing operation described employed only one sealing shoe and one clamping frame in conjunction with the anvil 10, other variations may be employed such as having two such shoes coact with opposite sides of the anvil or four straight edged shoes simultaneously pressing against four faces of the anvil. Other modifications may utilize mechanical press means other than fluid pressure cylinders to supply the necessary clamping and bonding pressures, such as levers or toggles which may be provided with adjustable spring or weight loading devices.

In still another embodiment, the anvil may be omitted and a plurality of flat layers of thermoplastic material may be assembled with a thermal gradient sheet on each exterior face of the assembly, clamped between a pair of flat clamps having their slots aligned in registry and the layers heat sealed from both sides with straight edged, hot, press shoes projecting through the slots in the clamps and pressing in opposition to one another against the exposed face of each thermal gradient sheet. This procedure may be preferable for bonding all of the interfaces of three or more layers of thermoplastic material where both of the exterior faces of the assembly are accessible.

The backing member may also be omitted in instances where the article being sealed is sufficiently rigid to withstand the bonding pressure, as for instance, in sealing a thermoplastic wrapper on a properly supported metal container.

Many other such variations or modifications of the present invention may be made without departing from its purview; accordingly this invention should not be construed as limited in any particulars except as may be recited in the appended claims or required in the prior art.

What is claimed is:

1. A process for heat sealing layers of thermoplastic material which comprises clamping a relatively thin sheet of material of substantial heat conductivity on the outside of a plurality of assembled layers of weldable thermoplastic material in spaced areas separated by an intermediate area in which a face of said thin sheet is exposed, contacting the exposed face of said thin sheet in said intermediate area with a heated body while exerting sufficient force to press the underlying areas of said layers of thermoplastic material firmly together, and transferring sufficient heat by conduction from said heated body through said intervening thin sheet into the adjoining layer of thermoplastic material over a substantially larger area of said adjoining layer than the area of contact between said heated body and said thin sheet to bond at least two of said layers of thermoplastic material together without formation of a substantial bead along the surface of the resulting bonded area of said layers.

2. A process according to claim 1 in which at least a portion of the exposed area of said thin sheet is temporarily deformed by the force exerted by said heated body.

3. A process according to claim 1, in which the thermoplastic material of at least one of said layers contains polymeric styrene.

4. A process according to claim 1 in which at least one of said layers of thermoplastic material contains a copolymer of styrene and a hydrocarbon elastomer.

5. A process according to claim 1 in which at least one of said layers of thermoplastic material is oriented.

6. A process according to claim 1 in which said layers of thermoplastic material are firmly clamped under sufficient pressure to prevent substantial alteration of the planar dimensions thereof.

7. A process according to claim 1 in which the contact of said heated body establishes a thermal gradient in said thin sheet gradually decreasing from a maximum temperature in said area of contact as the distance from said area increases and providing temperature above the softening point of said thermoplastic material in areas thereof closely adjacent to the area underlying said area of contact.

8. A process for heat sealing layers of thermoplastic material which comprises clamping a thin resiliently deformable sheet of metal between about 1 and 35 mils thick on the outside of a plurality of assembled layers of weldable thermoplastic material against an anvil in spaced areas separated by an intermediate area using sufficient pressure to prevent substantial alteration of the planar dimensions of said layers, at least one of said layers containing oriented thermoplastic material, contacting the exposed face of said film sheet in said intermediate area with a curved part of a heated body to establish a thermal gradient in said thin sheet of elevated temperatures ranging from a maximum temperature in the area of said contact and gradually decreasing with increasing distance therefrom, exerting sufficient force between said body and a substantially flat area of the face of said anvil to press the underlying areas of said thin sheet and said layers of thermoplastic material firmly together, and transferring sufficient heat by conduction from said heated body through said intervening thin sheet into the adjoining layer of thermoplastic material over a substantially larger area of said adjoining layer than said area of contact between the heated body and the thin sheet to bond at least two of said layers of thermoplastic material together in said underlying area and to heat closely adjacent areas of said adjoining layer of thermoplastic material above its softening point in order to prevent the formation of a substantial bead along the surface of the resulting bonded area of said layers.

9. Apparatus for heat sealing thermoplastic materials which comprises clamp means for holding a plurality of superimposed layers of weldable thermoplastic material in spaced areas separated by an intermediate area therebetween, a thin sheet of material of substantial heat conductivity positioned between said clamp means and said thermoplastic material, a press member adapted to contact the face of said thin sheet exposed in said intermediate area, means for heating said press member and means for exerting sufficient force upon said press member to press the underlying areas of said thin sheet and said layers of thermoplastic material firmly together, whereby heat is transferred by conduction from said heated press member through said intervening thin sheet into the adjoining layer of thermoplastic material over a substantially larger area of said adjoining layer than the area of contact between said heated press member and said thin sheet to bond at least two of said layers of thermoplastic material together without formation of a substantial bead along the surface of the resulting bonded area of said layers.

10. Apparatus according to claim 9, in which said thin sheet is resiliently deformable under pressure.

11. Apparatus according to claim 9 in which the material of said thin sheet has a heat conductivity of at least about 0.0001 B.t.u./sec./sq. in./° F./in.

12. Apparatus according to claim 9 in which said thin sheet is a metallic sheet.

13. Apparatus according to claim 9 in which the thickness of said thin sheet is between about 1 and 35 mils.

14. Apparatus according to claim 9 in which a curved part of said press member is adapted to bear against said exposed face of the thin sheet.

15. Apparatus according to claim 9 in which at least one part of said thin sheet is fastened to said clamp means.

16. Apparatus according to claim 9 in which said clamp means clamps said layers of thermoplastic material under sufficient pressure to prevent substantial alteration of the planar dimensions thereof.

17. Apparatus according to claim 9 in which said clamp means includes a slotted member having clamping surfaces separated by an elongated slot commensurate in size with said intermediate area, and an elongated edge of said heated press member is adapted to project through said slot and bear against said exposed face of the thin sheet.

18. Apparatus for heat sealing thermoplastic materials which comprises an anvil for backing up a plurality of superimposed layers of weldable thermoplastic material, clamp means coacting with said anvil to firmly clamp said layers of thermoplastic material against said anvil in spaced areas separated by an intermediate area with sufficient pressure to prevent substantial alteration of the planar dimensions of said layers, a thin resiliently deformable sheet of metal between about 1 and 35 mils thick located between said clamp means and said thermoplastic material, a press member coacting with said anvil and having a curved part adapted to contact the exposed face of said thin sheet in said intermediate area, means for exerting sufficient force between said press member and said anvil in said intermediate area to press the underlying areas of said thin sheet and said layers of thermoplastic material firmly together, and means for heating said press member to establish a thermal gradient in said thin sheet of elevated temperatures ranging from a maximum temperature in the area of contact with said press member and gradually decreasing with increasing distance therefrom, whereby heat is transferred by conduction from said heated press member through said intervening thin sheet into the adjoining layer of thermoplastic material over a substantially larger area of said adjoining layer than the area of contact between said heated press member and said thin sheet to bond at least two of said layers of thermoplastic material together in said underlying area and to heat closely adjacent areas of said adjoining layer of thermoplastic material above its softening point in order to prevent the formation of a substantial bead along the surface of the resulting bonded area of said layers.

References Cited

UNITED STATES PATENTS

| | | | |
|---|---|---|---|
| 2,710,046 | 6/1955 | Markus et al. | 156—323 X |
| 3,070,004 | 12/1962 | Dodsworth | 100—93 |
| 3,196,068 | 7/1965 | Schoder et al. | 156—537 |
| 3,231,449 | 1/1966 | Tomson | 156—583 |
| 3,272,674 | 9/1966 | Sachs et al. | 156—282 |

EARL M. BERGERT, *Primary Examiner.*

M. L. KATZ, *Assistant Examiner.*